(12) United States Patent
Qin et al.

(10) Patent No.: US 11,429,014 B2
(45) Date of Patent: Aug. 30, 2022

(54) LASER ANIMATION PROJECTION DEVICE AND A CONTROL METHOD THEREOF

(71) Applicant: Changxing Potek Electronics Technology Co., Ltd., Huzhou (CN)

(72) Inventors: Bing Qin, Huzhou (CN); Meihang Cai, Huzhou (CN); Dejun Jiang, Huzhou (CN)

(73) Assignee: Changxing Potek Electronics Technology Co., Ltd., Huzhou (CN)

( * ) Notice: Subject to any disclaimer, the term of this patent is extended or adjusted under 35 U.S.C. 154(b) by 0 days.

(21) Appl. No.: 17/309,312

(22) PCT Filed: Oct. 11, 2019

(86) PCT No.: PCT/CN2019/110508
§ 371 (c)(1),
(2) Date: May 18, 2021

(87) PCT Pub. No.: WO2020/108108
PCT Pub. Date: Jun. 4, 2020

(65) Prior Publication Data
US 2022/0011658 A1  Jan. 13, 2022

(30) Foreign Application Priority Data

Nov. 26, 2018 (CN) .......................... 201811415650.7

(51) Int. Cl.
*G03B 21/14* (2006.01)
*G03B 21/20* (2006.01)
(Continued)

(52) U.S. Cl.
CPC ....... *G03B 21/2033* (2013.01); *G02B 26/105* (2013.01); *G03B 21/145* (2013.01); *G03B 21/28* (2013.01)

(58) Field of Classification Search
CPC ...... G03B 21/00; G03B 21/14; G03B 21/203; G03B 21/28; G03B 21/145; G02B 26/10; G02B 26/105
See application file for complete search history.

(56) References Cited

U.S. PATENT DOCUMENTS

| 6,798,575 | B2 * | 9/2004 | Kobayashi | ........... H04N 9/3129 348/E9.026 |
| 7,484,340 | B2 * | 2/2009 | Ishihara | ............... H04N 9/3129 359/484.01 |

(Continued)

FOREIGN PATENT DOCUMENTS

| CN | 104639922 | * | 5/2015 |
| CN | 10872973 | * | 8/2017 |

(Continued)

*Primary Examiner* — William C. Dowling
(74) *Attorney, Agent, or Firm* — Wang Law Firm, Inc.

(57) ABSTRACT

The present invention discloses a laser animation projection device. The device comprises a controlling mainboard, an X-axis high-speed galvanometer motor, a Y-axis high-speed galvanometer motor and a laser device; a MCU is disposed on the controlling mainboard; an X-axis galvanometer lens is connected to an output shaft of the X-axis high-speed galvanometer motor; a Y-axis galvanometer lens is connected to an output shaft of the Y-axis high-speed galvanometer motor; a display screen is disposed in front of the two galvanometer lenses; a WIFI module is disposed on the controlling mainboard; the laser device is positioned according to positions of the two galvanometer lenses, so as to make the laser emitted by the laser device be reflected onto the display screen through the two galvanometer lenses. A control method for the laser animation projection device is also disclosed.

4 Claims, 1 Drawing Sheet

(51) Int. Cl.
*G02B 26/10* (2006.01)
*G03B 21/28* (2006.01)

(56) References Cited

U.S. PATENT DOCUMENTS

| | | | | |
|---|---|---|---|---|
| 8,368,971 B2 * | 2/2013 | Ishihara | ............... | G02B 26/106 |
| | | | | 359/305 |
| 2013/0286362 A1 * | 10/2013 | Imai | ....................... | G03B 21/53 |
| | | | | 353/85 |

FOREIGN PATENT DOCUMENTS

| CN | 207148420 U | | 3/2018 |
|---|---|---|---|
| CN | 107870414 A | | 4/2018 |
| CN | 107479854 | * | 5/2018 |
| CN | 108121066 A | | 6/2018 |

* cited by examiner

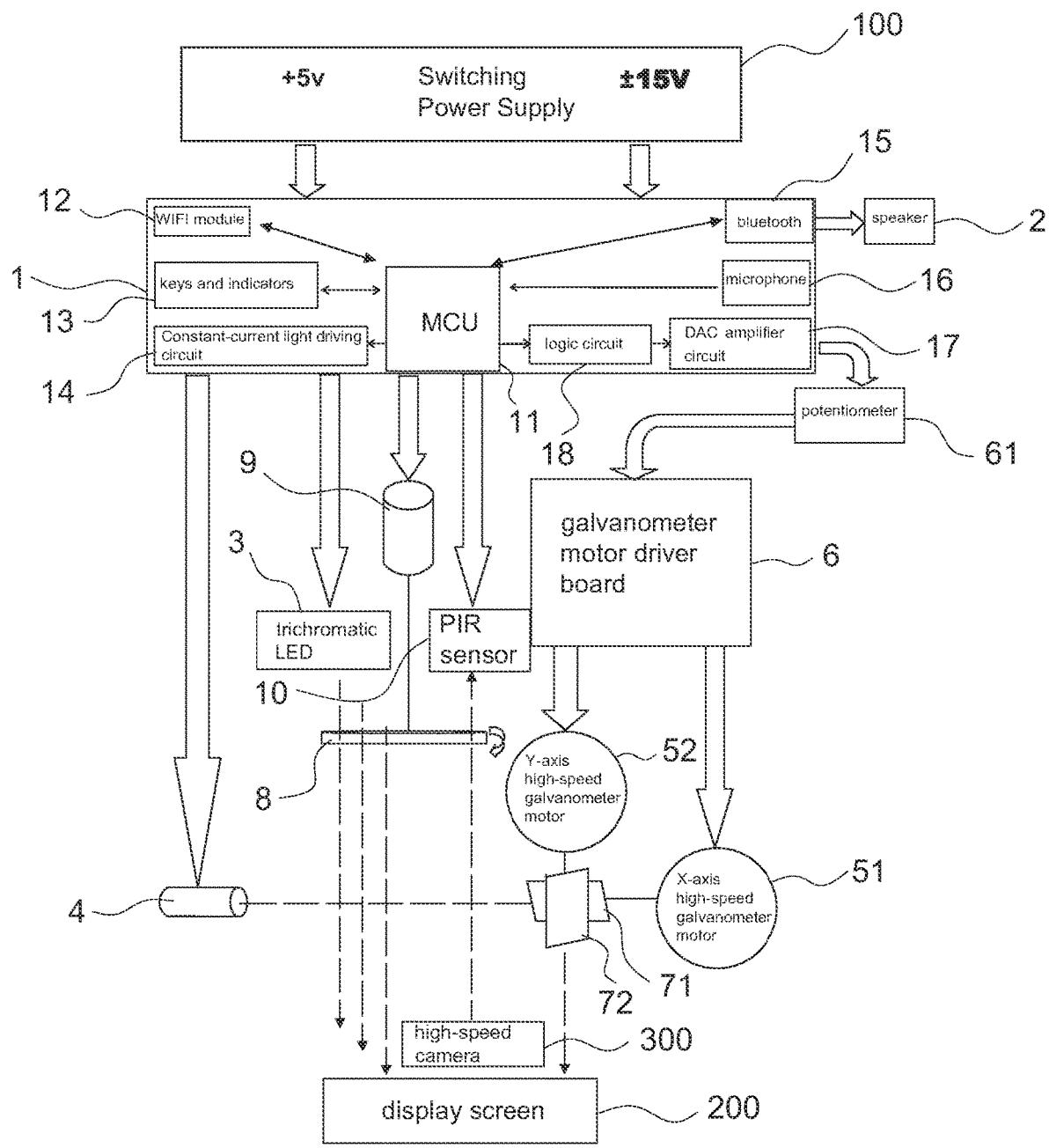

LASER ANIMATION PROJECTION DEVICE AND A CONTROL METHOD THEREOF

TECHNICAL FIELD OF THE INVENTION

The present invention relates to display devices, and in particular to a laser animation projection device and a control method thereof.

BACKGROUND OF THE INVENTION

The laser projection device transmits pictures by laser beams, and mainly comprises the following optical components: red, green and blue light valves, a beam combining X prism, a projection lens and a driving light valve. Red, green and blue lasers will be produced. Laser beams are expanded by the corresponding optical elements and processing chips in the machine and then transmitted to the X prism, the three laser beams are integrated by the X prism, and the integrated laser beam is transmitted to a projection screen by a projection objective lens, so that the whole display process of the laser projector is completed.

In the existing laser projection devices, for example, the brightness-enhanced laser line scanning projection system disclosed in Chinese Patent Application 201010226702.3 comprises a laser diode and collimating lens system, inclined parallel plates, a zoom lens system for zooming-out, a horizontal X-direction galvanometer motor, an X-direction galvanometer reflector, a vertical Y-direction galvanometer motor, a Y-direction galvanometer reflector, a display screen and formed image lines. When the horizontal X-direction galvanometer motor and the vertical Y-direction galvanometer motor do a rotary scanning motion, the light spot formed by the light beam emitted by the zoom lens system on the screen will quickly scan and move to form an image. For another example, Chinese Patent Application 201820068361.3 has disclosed a 3D laser projection device and system, wherein the device comprises an image demodulator, a laser driver, a laser light source, a motor driver, a polarization conversion device, a scanning driver and a scanning galvanometer; the image demodulator generates a laser driving signal, a motor driving signal and a scanning driving signal according to the video signal; the laser driver drives the laser light source to emit a polarized laser beam according to the laser driving signal; the motor driver drives the motor to drive the lens set to move so that the plate glass and the wave plate are alternately located on the optical path of the polarized laser beam.

The existing laser projection devices can only play the built-in animation or the animation in a SD card. The updated content needs to be firstly edited in a computer, the memory card is taken out, and the updated content is copied from the computer. The program list also needs to be altered manually. As a result, the operation steps are cumbersome.

SUMMARY OF THE INVENTION

It is a first object of the present invention to provide a laser animation projection device, which can realize online editing and downloading and is convenient to use.

It is a second object of the present invention to provide a control method for the laser animation projection device.

For achieving the first object, the laser animation projection device comprises: a controlling mainboard for controlling, an X-axis high-speed galvanometer motor, a Y-axis high-speed galvanometer motor and a laser device; wherein, a Microcontroller Unit (MCU), for controlling the X-axis high-speed galvanometer motor, the Y-axis high-speed galvanometer motor and the laser device, is disposed on the controlling mainboard; an X-axis galvanometer lens is connected to an output shaft of the X-axis high-speed galvanometer motor; a Y-axis galvanometer lens is connected to an output shaft of the Y-axis high-speed galvanometer motor; a display screen is disposed in front of the X-axis galvanometer lens and the Y-axis galvanometer lens; a WIFI module, for enabling the controlling mainboard to be connected to a server, is disposed on the controlling mainboard; the laser device is positioned according to positions of the X-axis galvanometer lens and the Y-axis galvanometer lens, so as to make the laser emitted by the laser device be reflected onto the display screen through the X-axis galvanometer lens and the Y-axis galvanometer lens.

To facilitate the transmission of audio signals, preferably, a Bluetooth module electrically connected to the MCU is further disposed on the controlling mainboard; the Bluetooth module is connected to a speaker; and, the Bluetooth module is a dual-band Bluetooth chip capable of transmitting both data and audio.

To drive the laser device conveniently, preferably, a constant-current light driving circuit electrically connected to the MCU is further disposed on the controlling mainboard, and the constant-current light driving circuit is electrically connected to the laser device to drive the laser device.

To form the background of the animation and achieve the flowing aurora effect, preferably, the laser animation projection device further comprises a trichromatic LED driven by the constant-current light driving circuit, an optical lens and a DC motor for driving the rotation of the optical lens; the display screen is disposed in front of the trichromatic LED; and, the optical lens is disposed between the trichromatic LED and the display screen.

To facilitate the synchronization of the light effect and the music, preferably, a microphone that is electrically connected to the MCU and configured to acquire music signals is further disposed on the controlling mainboard, and the MCU controls the trichromatic LED through the constant-current light driving circuit according to the signal acquired by the microphone.

To protect human eyes from damage by laser, preferably, the laser animation projection device further comprises a human body sensing unit for sensing the movement of a human body in a light outgoing region between the two galvanometer lenses and the display screen; the human body sensing unit is a PIR sensor connected to the controlling mainboard; and, the PIR is disposed adjacent to light outgoing ports of the two galvanometer lenses.

To drive the galvanometer motors conveniently, preferably, the laser animation projection device further comprises a galvanometer motor driver board for driving the two galvanometer motors; a logic circuit electrically connected to the MCU is further disposed on the controlling mainboard; the logic circuit is further electrically connected to a two-way Digital to Analog Converter (DAC) amplifier circuit; and, the DAC amplifier circuit is electrically connected to the galvanometer motor driver board through a potentiometer.

For achieving the second object, the control method for the laser animation projection device comprises the following steps:

1) the galvanometer motor driver board obtaining initial values of the voltage and current from the MCU, so that a laser emitted by the laser device is capable of projecting onto an initial theoretical coordinate position on the display screen; capturing, by a high-speed camera, an initial actual coordinate position of the projection of the laser emitted by the laser device on the display screen; comparing the initial actual coordinate position with the initial theoretical coordinate position, and performing static point calibration by the following method: theoretical coordinate value=tan(real-time voltage)value/10×20°)×projection distance, and decreasing a voltage output coefficient if the initial actual coordinate value acquired by the high-speed camera is greater than the initial theoretical coordinate value, or otherwise increasing the voltage output coefficient, with a change amount of 0.01% each time, until the difference between the initial theoretical coordinate value and the initial actual coordinate value is less than 0.01%, so that static calibration of a coordinate point is completed; and calibrating 256×256 coordinate points one by one by the above step, to obtain a voltage output coefficient corresponding to each coordinate point;

2) calculating a next theoretical coordinate value by calculating the theoretical coordinate value by using the previous actual coordinate position, then predicting a next theoretical coordinate position of the laser emitted by the laser device, and comparing the next theoretical coordinate position with the previous theoretical coordinate position to obtain a theoretical change angle; and after the voltage corresponding to the next theoretical coordinate position is output, capturing, by the high-speed camera, the current actual coordinate position of the projection of the laser emitted by the laser device on the display screen at the same moment, and comparing the current actual coordinate position with the previous actual coordinate position to obtain an actual change angle;

3) comparing, by the logic circuit, a difference between the theoretical change angle and the actual change angle obtained in step 2), and adjusting the current according to this difference; increasing the current if the absolute value of the difference between and is greater than 90°, where the value of the current adjusted is smaller if the difference is smaller, and the value of the current adjusted is larger if the difference is larger; decreasing the current if the absolute value of the difference between and is less than 90°, where the value of the current adjusted is smaller if the difference is smaller, and the value of the current adjusted is larger if the difference is larger; and returning to the step 2) for next adjustment.

Preferably, in the step 3), the MCU modulates the magnitude of the output current by a pulse width modulation (PWM) technology; and the current is amplified by the DAC amplifier circuit and then output to the galvanometer motor driver board, so that the two galvanometer motors are driven according to the adjusted current and voltage.

To ensure effective data transmission between the MCU and the galvanometer motor driver board without occupying the CPU and avoid image distortion, preferably, data transmission between the MCU and the galvanometer motor driver board of the controlling mainboard is performed by Direct Memory Access (DMA) transmission.

To display reliable broken images, preferably, coordination correction is performed by sampling using the high-speed camera and a virtual transmission algorithm, comprises the following steps:

1) setting, by the MCU of the controlling mainboard, a virtual parameter to be synchronously run with DMA, the virtual parameter being data having the same structure with the effective data in DMA transmission; and 2) acquiring, by the high-speed camera, coordinates of the projection of the laser emitted by the laser device on the display screen at regular intervals; synchronously acquiring the state of the virtual parameter by the MCU; indicating that the current effective data has been changed for N times if it is found that the state of the virtual parameter has been changed for N times, and then obtaining the theoretical coordinate value represented by the current effective data; and, comparing the theoretical coordinate value with the current actual coordinate value at the same moment, so as to determine and control the position of the laser.

Compared with the prior art, the present invention has the following advantages. In the present invention, the animation playback and edition devices are simplified, in detail, the animation can be produced in a computer and then be uploaded to a server, and pictures or animation programs can be downloaded by connecting the server via WIFI, so the laser animation projection device of the present invention is easy and convenient to use. The human body sensing unit arranged at the light outgoing ports can detect the presence of a person in front, avoiding damage to human eyes by laser.

BRIEF DESCRIPTION OF THE DRAWINGS

FIG. 1 is a schematic block diagram according to an embodiment of the present invention.

DETAILED DESCRIPTION OF THE INVENTION

The present invention will be further described in detail by embodiments with reference to the accompanying drawings.

As shown in FIG. 1, a laser animation projection device comprises a controlling mainboard 1, a speaker 2, a trichromatic LED 3, a laser device 4, an X-axis high-speed galvanometer motor 51, an Y-axis high-speed galvanometer motor 52, a galvanometer motor driver board 6, an X-axis galvanometer lens 71, a Y-axis galvanometer lens 72, an optical lens 8, a DC motor 9, a human body sensing unit 10 and a switching power supply 100.

A MCU 11, a WIFI module 12, a plurality of keys and indicators 13, a constant-current light driving circuit 14, a Bluetooth module 15, a microphone 16, a DAC amplifier circuit 17 and a logic circuit 18 are disposed on the controlling mainboard 1. The WIFI module 12, the keys and indicators 13, the constant-current light driving circuit 14, the Bluetooth module 15, the microphone 16 and the logic circuit 18 are all electrically connected to the MCU 11, and the DAC amplifier circuit 17 is electrically connected to the logic circuit 18. The WIFI module 12, the keys and indicators 13 and the Bluetooth module 15 are in bidirectional communication with the MCU 11, the MCU 11 outputs a control instruction to the constant-current light driving circuit 14 and the DAC amplifier circuit 17, and the microphone 16 transmits the sampled signal to the MCU 11. The constant-current light driving circuit 14 is configured to control the trichromatic LED 3 and the laser device 4, and the Bluetooth module 15 is configured to transmit data and audio signals to the speaker 2.

The WIFI module 12 is configured to enable the controlling mainboard 1 to be connected to a server to download pictures and animation, and also can realize the remote control of the controlling mainboard 1. The WIFI module 12 uses the 802.11b/g/n protocol and the channel 1-14@2.4 GHz, supports the WPA/WPA2 safe mode and the SRA/AP/STA+AP operation module, and has a maximum output power of +20 dBm in the 802.11b mode.

The Bluetooth module 15 is connected to the speaker 12. A DC-DC conversion circuit specially for supplying power to the Bluetooth module 15 and the speaker 2 is integrated on the controlling mainboard 1 in order to ensure that the played sound quality is not interfered by the power supply signal. The Bluetooth module 15 is a dual-band Bluetooth chip, which is internally provided with a programmable controller and can transmit both data and audio signals. After the Bluetooth of a mobile phone is connected to the Bluetooth module 15, an audio signal can be directly transmitted to the dual-band Bluetooth chip and then played by the speaker 2 by power amplification.

The microphone 16 is configured to acquire music signals. The sampling frequency is controller at 10 KHz, and the frequency response range is 0.1 to 10 KHz which covers majority of the audio range. The acquired music signal is transmitted to the MCU 11, and the sampled signal is processed by the MCU 11 and subjected to ADC conversion. The latest 10000 sampled values are classified into 100 groups, and the groups are averaged and compared to obtain differences. If the difference reaches a trigger threshold, it is recorded as a rhythm point. A plurality of rhythm points are accumulated, and the trichromatic LED 3 is controlled according to the rhythm change through the constant-current light driving circuit 14.

The MCU 11 outputs data to two-way DAC amplifier circuit 17 according to the data built-in the program or the downloaded data, the DAC amplifier circuit 17 amplifiers a 0-3 VDC analog signal to ±10 VDC and then transmits it to a potentiometer 61. The ±10 VDC is linearly adjusted by the potentiometer 61 and then transmitted to the galvanometer motor driver board 6, and the operation of the X-axis high-speed galvanometer motor 51 and the Y-axis high-speed galvanometer motor 52 is controlled by the power amplifier circuit in the galvanometer motor driver board 6.

The X-axis galvanometer lens 71 is tightly adhered onto an output shaft of the X-axis high-speed galvanometer motor 51, and the Y-axis galvanometer lens 72 is tightly adhered onto an output shaft of the Y-axis high-speed galvanometer motor 52. By adjusting the amplification factor of the galvanometer motor driver board 6, the voltage signals of −10 to +10 VDC are allowed to correspond to angles of −20° to +20°, respectively. The laser device 4 is positioned according to positions of the X-axis galvanometer lens 71 and the Y-axis galvanometer lens 72. A display screen 200 is disposed in front of the two galvanometer lenses 71, 72.

A laser beam emitted by the laser device 4 is reflected to the Y-axis galvanometer lens 72 by the X-axis galvanometer lens 71, and then projected onto the display screen 200 in front by the Y-axis galvanometer lens 72. Since the two voltage signals cooperate with each other and change at a high speed, the reflection angle of the two galvanometer lenses 71, 72 is changed continuously. The light spot formed by the laser beam after being reflected by two lenses moves at a high speed on the display screen 200. Due to the vision persistence effect of human eyes, a complete pattern can be formed after the light spot completes one-cycle movement within 5 to 20 ms, and the signals transmitted to the two galvanometer motors by data transmission are changed continuously and regularly to form the final animation effect.

Each galvanometer motor has a scanning speed of 40 KPPS, an analog signal input impedance of 100 KΩ, and a voltage conversion speed of 6 mV/us when operating at the maximum amplitude, which is calculated at the accuracy of 8 bit. The data value that can be changed per us is 6 mV/[10V−(−10V)]*256=0.076, that is, one change is changed for 13 us fastest.

Since the galvanometer motor is a mechanical operation device, and the lens and motor bearing have certain mass, the inertia generated during high-speed operation will seriously affect the operation speed and result in serious distortion of the projected picture. Therefore, in this embodiment, the following method is used for controlling the device.

1) The MCU 11 outputs initial values of the voltage u and current i to the galvanometer motor driver board 6, so that the laser emitted by the laser device 4 can be projected onto an initial theoretical coordinate position (x, y) on the display screen 200 (e.g., the center of the display screen 200). The high-speed camera 300 captures an initial actual coordinate position $(x_1, y_1)$ of the projection of the laser emitted by the laser device 4 on the display screen 200. The initial actual coordinate position is compared with the initial theoretical coordinate position, and static point calibration is performed by the following method: theoretical coordinate value=tan (real-time voltage)value/10×20°)×projection distance. A voltage output coefficient will be decreased (the initial value of this coefficient is 100%) if the initial actual coordinate value acquired by the high-speed camera 300 is greater than the initial theoretical coordinate value, or otherwise the voltage output coefficient will be increased, with an amount of 0.01% increased or decreased each time, until the difference between the initial theoretical coordinate value and the initial actual coordinate value is less than 0.01%, so that static calibration of the initial coordinate point is completed. 256×256 coordinate points are calibrated one by one by the above step, to obtain a voltage output coefficient corresponding to each coordinate point. During the dynamic playback process, when the coordinate data of each point is output by voltage adjustment, it will be multiplied by the voltage output coefficient obtained by the previous calibration.

2) A next theoretical coordinate value is calculated by calculating the theoretical coordinate value (at start, the real-time voltage value is the voltage value when the projected light is at the initial actual coordinate position), and a next theoretical coordinate position (x', y') of the laser emitted by the laser device 4 is predicted. The next theoretical coordinate position is compared with the previous theoretical coordinate position (at start, compared with the initial theoretical coordinate position) to obtain a theoretical change angle $\Delta\theta = t(x, y) = \arctan((x-x')/(y-y'))$. After the voltage corresponding to the next theoretical coordinate position is output, The high-speed camera 300 captures the current actual coordinate position $(x_1', y_1')$ of the projection of the laser emitted by the laser device 4 on the display screen 200 at the same moment, and the current actual coordinate position is compared with the previous actual coordinate position (at start, compared with the initial actual coordinate position) to obtain an actual change angle $\Delta\theta_1 = t(x_1, y_1) = \arctan((x_1-x_1')/(y_1-y_1'))$.

3) The logic circuit 18 compares $\Delta\theta$ and $\Delta\theta_1$ obtained in the step 2) to obtain a difference. Due to the inertia of the moving object, the actual coordinate position is certainly behind the theoretical coordinate position. To reduce the influence from the inertia, the current i is adjusted according to the difference. The current i will be increased if the absolute value of the difference between $\Delta\theta$ and $\Delta\theta_1$ is greater than 90°, where the value of the current i adjusted is smaller if the difference is smaller, and the value of the current i adjusted is larger if the difference is larger; and, the current i will be decreased if the absolute value of the difference between $\Delta\theta$ and $\Delta\theta_1$ is less than 90°, where the value of the current i adjusted is smaller if the difference is smaller, and the value of the current i adjusted is larger if the difference is larger. There may be a linear relationship between the difference between $\Delta\theta$ and $\Delta\theta_1$ and the value of the current i adjusted. Then, the process returns to the step 2) for next adjustment. The achieved actual effects will be described below. When the change in angle is larger, a larger instantaneous driving current is provided, so that the laser spot cancels the previous impulse within a short time and change the movement direction faster; and, when the change in angle is smaller, the power required to change the impulse and direction is lower, and the output instantaneous current is decreased.

In the step 3), the current i is adjusted in a variable power driving mode. In detail, the MCU 11 modulates the magnitude of the output current i by a pulse width modulation (PWM) technology. Without changing the total power, the current is amplified by the DAC amplifier circuit 17 and then output to the galvanometer motor driver board 6, so that the two galvanometer motors are driven according to the adjusted current and voltage. Therefore, the instantaneous power is improved by the DAC amplifier circuit 17, and a higher instantaneous power is realized by the logic circuit 18 when the change in angle is larger, so that a sufficient torque can be provided when it is required to cancel the inertia.

The power supplies for the trichromatic LED 3 and the laser device 4 are supported by independent low drop-out (LDO) linear voltage regulators. Three signals of the MCU 11 for controlling LED light are input into the constant-current light driving circuit 14, a quad operational amplifier integrated chip in the constant-current light driving circuit 14 compares the voltage of a sampling resistor and then outputs a constant current to the laser device 4 and the trichromatic LED 3 through a driving triode.

The optical lens 8 is disposed in front of the trichromatic LED 3, and the optical lens 8 is located between the trichromatic LED 3 and the display screen 200. The DC motor 9 is configured to drive the rotation of the optical lens 8, and the DC motor 9 is electrically connected to the controlling mainboard 1 and controlled by the controlling mainboard 1. Light from the trichromatic LED 3 produces color lines through the optical lens 8 and then projected onto the display screen 200 to serve as the background. The DC motor 9 slowly rotates to drive the optical lens 8 so that the color LED light background forms a flowing aurora effect. The brightness and color of the background light change with the rhythm of the music.

The vision persistence time of the human being ranges from 50 ms to 200 ms. To achieve the display effect without visual flickers during playing animation, the display cycle needs to be within 20 ms, and more than 1000 data points are required to form a relatively complex picture. Thus, a set of data needs to be transmitted every 20 us. This will lead two problems. Firstly, when a single-chip microcomputer processes numerous tasks, particularly operating the system, it is difficult to ensure the efficiency of data transmission, so that the image quality will be affected. Secondly, the operation speed of the galvanometer lenses can reach a nominal value only in case of a smooth trajectory, a serious delay will be caused when the change in angle is large, resulting in picture distortion. Therefore, in this embodiment, a direct memory access (DMA) transmission mode is employed between the controlling mainboard 1 and the galvanometer motor driver board 6 (from the MCU 11 to the DAC amplifier circuit 17 to the galvanometer motor driver board 6), so that effective data transmission between the MCU 11 and the galvanometer motor driver board 6 is ensured without occupying the CPU. Moreover, the data transmission synchronization delay is set according to the size of the calculated angle value when the change in angle is large, so the trajectory of the laser spot can be correctly operated to the specific coordinate position.

Since it will take a certain time to activate the laser device 4, the position of the bright spot of the image will be delayed, and the CPU cannot detect and control the data transmission state in real time in the DMS transmission mode, so that the broken display position is not accurate and the image is distorted. Therefore, in this embodiment, coordination correction is performed by sampling using the high-speed camera 300 and a virtual transmission algorithm, comprising the following steps.

1) A virtual parameter to be synchronously run with DMA is set by the MCU 11 of the controlling mainboard 1. The virtual parameter is data having the same structure with the effective data in the DMA transmission, comprising the following information: X-coordinate, Y-coordinate, laser switching signal, color signal or the like.

2) The high-speed camera 300 acquires coordinates of the projection of the laser emitted by the laser device 4 on the display screen 200 at regular intervals. The MCU 11 synchronously acquires the state of the virtual parameter. If it is found that the state of the virtual parameter has been changed for N times (the change in the state of the virtual parameter may be ruled by programs, for example, 1 is added each time if it is required to calculate the number of times; and, a same algorithm will be used if it is required to know the change amount of the effective data), it can be known that the current effective data has been changed for N times, and then the theoretical coordinate value represented by the current effective data after changed for N times can be known according to the rules set by programs. The theoretical coordinate value is compared with the current actual coordinate value at the same moment, so as to accurately determine and control the position of the laser and form a reliable broken display image.

To protect human eyes from damage by laser, in this embodiment, the laser animation projection device further comprises a human body sensing unit 10. The human body sensing unit is a PIR sensor and may be disposed adjacent to light outgoing ports of the two galvanometer lenses to detect infrared rays emitted by a human body acquired by a Fresnel lens in a light outgoing region between the galvanometer lenses and the display screen 200. Since the Fresnel lens has a plurality of partition windows, the change in the infrared rays can be detected. When a person passes by or moves in front, a PIR signal will be triggered. After the signal is transmitted to the controlling mainboard 1, the MCU 11 immediately sends an instruction to turn off the laser device 4, avoiding damage caused by the laser when a person accidentally passes by or a child accidentally goes to the front of the instrument.

The switching power supply 100 may input 100-240 Vac wide voltage, and has two outputs, i.e., ±15V/1 A and +5V/3 A, to supply power to the controlling mainboard 1 and the galvanometer motor driver board 6, respectively.

The laser animation projection device of the present invention integrates music playback, sound control, human body sensing, automatic playing and remote editing. The animation playback and edition devices in the prior art are simplified in the present invention. The animation can be produced in a computer and then be uploaded to a server, and pictures or animation programs can be downloaded by connecting the server via WIFI, therefore, the device is easy and convenient to use. The human body sensing unit 10 disposed at the light outgoing ports can detect the presence of a person in front, avoiding damage to human eyes by laser.

The invention claimed is:

1. A control method for a laser animation projection device, wherein the method comprises the following steps:
   1) controlling, by a controlling mainboard (1), an X-axis high-speed galvanometer motor (51), a Y-axis high-speed galvanometer motor (52), and a laser device (4), the controlling mainboard (1) having a microcontroller unit (11) which controls the X-axis high-speed galvanometer motor (51), the Y-axis high-speed galvanometer motor (52), and the laser device (4);
   2) driving the X-axis high-speed galvanometer motor (51) and the Y-axis high-speed galvanometer motor (52) by a galvanometer motor driver board (6), the galvanometer motor driver board (6) being electrically connected to the microcontroller unit (11) by a potentiometer (61), a two-way DAC amplifier circuit (17), and a logic circuit (18) in series;
   connecting the controlling mainboard (1) to a server by a WIFI module (12) disposed on the controlling mainboard (1);
   3) positioning the laser device (4) by an X-axis galvanometer lens (71) and a Y-axis galvanometer lens (72), wherein the X-axis galvanometer lens (71) is connected to an output shaft of the X-axis high-speed galvanometer motor (51) and the Y-axis galvanometer lens (72) is connected to an output shaft of the Y-axis high speed galvanometer motor (52);
   4) emitting a laser by the laser device (4);
   5) reflecting the laser emitted by the laser device (4) onto a display screen (200) which is disposed in front of the X-axis galvanometer lens (71) and the Y-axis galvanometer lens (72);
   6) obtaining, by the galvanometer motor driver board (6), initial values of the voltage and current from the microcontroller unit (11), so that the laser emitted by the laser device (4) is capable of projecting onto an initial theoretical coordinate position on the display screen (200);
   capturing, by a high-speed camera (300), an initial actual coordinate position of the projection of the laser emitted by the laser device (4) on the display screen (200);
   comparing the initial actual coordinate position with the initial theoretical coordinate position, and performing static point calibration by the following method: theoretical coordinate value=tan(real-time voltage)value/ 10×20°×projection distance, and decreasing a voltage output coefficient if the initial actual coordinate value acquired by the high-speed camera (300) is greater than the initial theoretical coordinate value, or otherwise increasing the voltage output coefficient, with a change amount of 0.01% each time, until the difference between the initial theoretical coordinate value and the initial actual coordinate value is less than 0.01%, so that static calibration of a coordinate point is completed; and
   calibrating 256×256 coordinate points one by one by the above step, to obtain a voltage output coefficient corresponding to each coordinate point;
   7) calculating a next theoretical coordinate value by calculating the theoretical coordinate value by using the previous actual coordinate position, then predicting a next theoretical coordinate position of the laser emitted by the laser device (4), and comparing the next theoretical coordinate position with the previous theoretical coordinate position to obtain a theoretical change angle; and
   after the voltage corresponding to the next theoretical coordinate position is output, capturing, by the high-speed camera (300), the current actual coordinate position of the projection of the laser emitted by the laser device (4) on the display screen (200) at the same moment, and comparing the current actual coordinate position with the previous actual coordinate position to obtain an actual change angle;
   8) comparing, by the logic circuit (18), and obtained in the step to obtain a difference between the theoretical change angle and the actual change angle, and adjusting the current according to the difference;
   increasing the current if the absolute value of the difference is greater than 90°, where the value of the current adjusted is proportional to the absolute value of the difference;
   decreasing the current if the absolute value of the difference is less than 90°, where the value of the current adjusted is proportional to the absolute value of the difference; and
   returning to the step 7) for next adjustment.

2. The method of claim 1, wherein in the step 8), the microcontroller unit (11) modulates the magnitude of the output current by a pulse width modulation (PWM) technology; and
   the current is amplified by the DAC amplifier circuit (17) and then output to the galvanometer motor driver board (6), so that the two galvanometer motors (51, 52) are driven according to the adjusted current and voltage.

3. The method of claim 1, wherein data transmission between the microcontroller unit (11) and the galvanometer motor driver board (6) of the controlling mainboard (1) is performed by DMA transmission.

4. The method of claim 3, wherein coordination correction is performed by sampling using the high-speed camera (300) and a virtual transmission algorithm, comprises the following steps:
   1) setting, by the microcontroller unit (11) of the controlling mainboard (1), a virtual parameter to be synchronously run with DMA, the virtual parameter being data having the same structure with the effective data in DMA transmission; and
   2) acquiring, by the high-speed camera (300), coordinates of the projection of the laser emitted by the laser device (4) on the display screen (200) at regular intervals;
   synchronously acquiring the state of the virtual parameter by the microcontroller unit (11);
   indicating that the current effective data has been changed for N times if it is found that the state of the virtual parameter has been changed for N times, and then obtaining the theoretical coordinate value represented by the current effective data; and
   comparing the theoretical coordinate value with the current actual coordinate value at the same moment, so as to determine and control the position of the laser.

* * * * *